United States Patent
Claretti et al.

(10) Patent No.: US 11,059,373 B1
(45) Date of Patent: Jul. 13, 2021

(54) BRAKING SYSTEMS FOR AN AUTONOMOUS GROUND VEHICLE

(71) Applicant: Amazon Technologies, Inc., Seatle, WA (US)

(72) Inventors: Ennio Claretti, Seattle, WA (US); Nicolas Kurczewski, Seattle, WA (US); Andrew Stubbs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/215,100

(22) Filed: Dec. 10, 2018

(51) Int. Cl.
| | | |
|---|---|---|
| *B60L 7/24* | (2006.01) | |
| *B60T 1/06* | (2006.01) | |
| *G05D 1/02* | (2020.01) | |
| *H02P 3/12* | (2006.01) | |
| *B60K 7/00* | (2006.01) | |
| *B60L 7/00* | (2006.01) | |
| *B60P 3/00* | (2006.01) | |
| *B60L 50/50* | (2019.01) | |

(52) U.S. Cl.
CPC ............. *B60L 7/24* (2013.01); *B60K 7/0007* (2013.01); *B60L 7/003* (2013.01); *B60L 50/50* (2019.02); *B60P 3/007* (2013.01); *B60T 1/06* (2013.01); *G05D 1/021* (2013.01); *H02P 3/12* (2013.01)

(58) Field of Classification Search
CPC .. B60L 7/24; B60L 50/50; B60L 7/003; B60T 1/06; H02P 3/12; B60K 7/0007; B60P 3/007; G05D 1/021
See application file for complete search history.

(56) References Cited

U.S. PATENT DOCUMENTS

| | | | | |
|---|---|---|---|---|
| 3,924,902 | A * | 12/1975 | Engle | B60L 7/24 303/132 |
| 4,361,871 | A * | 11/1982 | Miller | B60T 8/17616 180/197 |
| 5,794,639 | A * | 8/1998 | Einbinder | A61H 3/04 135/67 |
| 6,078,156 | A * | 6/2000 | Spurr | H02P 3/08 318/368 |
| 6,450,587 | B1 * | 9/2002 | MacGregor | B60T 7/10 |
| 6,915,883 | B2 * | 7/2005 | Watanabe | B60T 1/005 188/156 |
| 7,600,825 | B2 * | 10/2009 | Ziegler | B60T 13/04 303/3 |
| 9,266,508 | B2 * | 2/2016 | Richard | B60T 7/12 |
| 9,373,149 | B2 * | 6/2016 | Abhyanker | G05D 1/0251 |
| 9,441,689 | B2 * | 9/2016 | Baehrle-Miller | B60T 13/741 |
| 9,855,934 | B2 * | 1/2018 | Yasui | F16D 71/04 |
| 9,889,831 | B2 * | 2/2018 | Yasui | B60T 13/741 |
| 9,925,998 | B2 * | 3/2018 | Ackerman | B65G 1/1375 |
| 9,975,729 | B2 * | 5/2018 | Rogers | B66B 1/308 |
| 10,216,188 | B2 * | 2/2019 | Brady | G06Q 50/28 |
| 10,407,041 | B2 * | 9/2019 | Heubner | F16H 63/3466 |
| 10,680,538 | B2 * | 6/2020 | Nagarajan | H02P 3/04 |
| 2003/0066719 | A1* | 4/2003 | Watanabe | F16D 65/18 188/72.7 |

(Continued)

*Primary Examiner* — Jacob B Meyer
(74) *Attorney, Agent, or Firm* — BakerHostetler

(57) ABSTRACT

A delivery AGV has a hybrid braking system. An emergency electrical brake shorts between motor contacts to stop the AGV quickly, but it doesn't work well to keep the AGV stopped, such as when on a hill. A mechanical parking brake is electrically actuated to lock the wheels. Both systems can be used at once for stopping the AGV.

20 Claims, 6 Drawing Sheets

(56) References Cited

U.S. PATENT DOCUMENTS

| | | | | |
|---|---|---|---|---|
| 2005/0145448 | A1* | 7/2005 | Watanabe | F16D 55/226 |
| | | | | 188/72.1 |
| 2005/0167212 | A1* | 8/2005 | Pascucci | B60T 13/741 |
| | | | | 188/72.2 |
| 2007/0284938 | A1* | 12/2007 | Ziegler | B60T 13/04 |
| | | | | 303/119.3 |
| 2009/0032321 | A1* | 2/2009 | Marsh | B60L 50/16 |
| | | | | 180/65.51 |
| 2009/0198427 | A1* | 8/2009 | Christopher Jackson | |
| | | | | B60T 8/1708 |
| | | | | 701/70 |
| 2013/0221737 | A1* | 8/2013 | Richard | B60T 8/1755 |
| | | | | 303/119.1 |
| 2014/0076674 | A1* | 3/2014 | Baehrle-Miller | B60T 13/662 |
| | | | | 188/159 |
| 2014/0136414 | A1* | 5/2014 | Abhyanker | G06Q 10/087 |
| | | | | 705/44 |
| 2015/0006005 | A1* | 1/2015 | Yu | G06Q 50/28 |
| | | | | 701/22 |
| 2015/0202770 | A1* | 7/2015 | Patron | G06Q 20/386 |
| | | | | 700/245 |
| 2016/0244035 | A1* | 8/2016 | Yasui | B60T 13/741 |
| 2017/0308098 | A1* | 10/2017 | Yu | G05D 1/024 |
| 2018/0024554 | A1* | 1/2018 | Brady | G06Q 10/08 |
| | | | | 701/23 |
| 2018/0154881 | A1* | 6/2018 | Heubner | F16D 65/14 |
| 2019/0348930 | A1* | 11/2019 | Paakkinen | B66B 1/30 |

\* cited by examiner

BRAKING SYSTEMS FOR AN AUTONOMOUS GROUND VEHICLE

BACKGROUND

The present invention relates to autonomous vehicles, and more particularly to features of a delivery autonomous for braking.

Safety when robots encounter people is, of course, paramount. Accordingly, safety standards, such as ISO TC 184/SC, Robots and Robotic Devices—Collaborative Robots, and ANSI RIA R15.06, Robot and Robot System Safety, have been developed. A collaborative robot is designed for direct interaction with a defined collaborative workspace. A collaborative workspace is the safeguarded space where the robot system and a person (that is, a human being) can perform tasks simultaneously during production operation. The objective of collaborative robots is to combine the repetitive performance of robots with the individual skills and ability of people.

One type of collaborative robot is an autonomous ground vehicle that drives over sidewalks and like surfaces for various purposes, including package delivery. In general, delivery AGVs have a control system that regulates voltage of the AGV's motors to control its speed. In circumstances in which a controlled, rapid stop is required, the control system can supply rapidly ramp down the power supplied to the motor or stop the power altogether, which enables the motor to stop.

Often, a delivery AGV slows down and stops merely be decreasing power (that is, typically current, but also encompassing voltage) to the motor, based on control signals.

DETAILED DESCRIPTION OF ILLUSTRATIVE EMBODIMENTS

Figure 1:
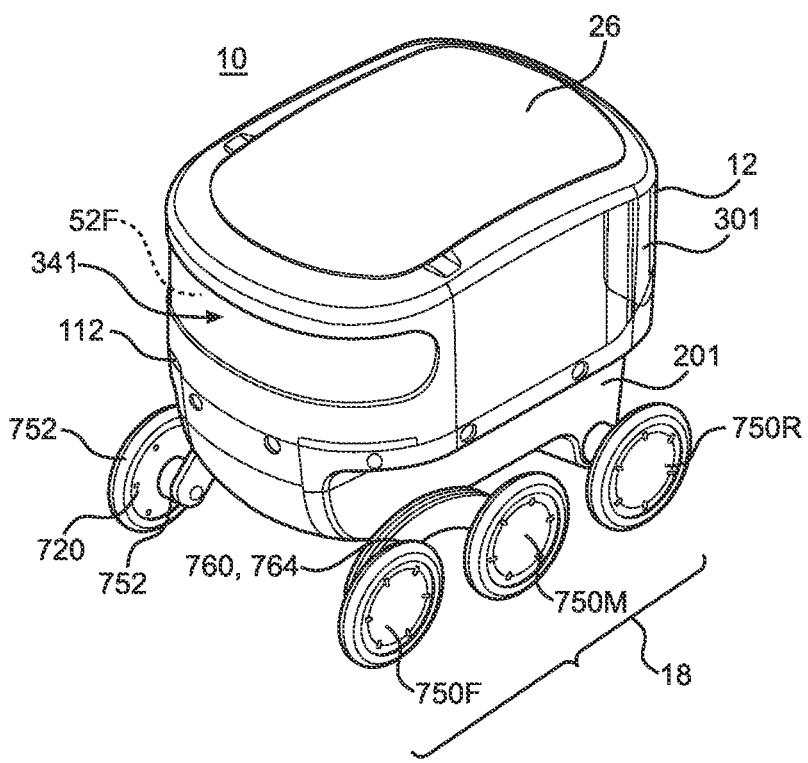
FIG. 1 is a perspective view of a delivery AGV of the type that can employ the braking systems disclosed herein.

An autonomous ground vehicle (AGV) is a category of robot that might operate at times in an unprotected, uncontrolled environment. The delivery AGV disclosed herein has a hybrid electrical braking system and mechanical system.

In general, an AGV of the type disclosed herein is a ground vehicle (typically unmanned) that operates, at least in some circumstances, without the need for a human controller, and at least at sometimes may operate in unprotected and uncontrolled environment. The AGV may use sensors to develop an understanding of the environment (sometimes only a limited understanding), which is then used by control algorithms to determine the next action to take in the context of a human-provided mission goal.

An AGV, both in general and in the context of a delivery AGV disclosed herein, in an uncontrolled, unprotected environment may have the ability to:

access information about the environment (such as maps of streets, sidewalks, and buildings, and in some cases building interiors);

detect people, obstacles (such as curbs, steps, bumps, slopes, and the like), objects (such as landscaping, gates, and the like), and surfaces (such as lawns, cobblestones, sidewalk cracks and discontinuities, and the like), and then evaluate and take action based on the detection; and travel under its own power to waypoints, usually by battery power and without human navigation assistance, taking into account the above information and detection.

In some circumstances, an AGV's onboard control system may be able to autonomously learn, such as adjusting strategies based on input about the surroundings, adapt to surroundings without outside assistance, and the like.

A particular subset of autonomous ground vehicles is an AGV that navigates to a desired residential or commercial location to carry an object, such as a package containing a commercial product. For example, United States Patent Publication Number 20180024554, titled "Autonomous Ground Vehicles Based At Delivery Locations," which is assigned to the assignee of the present invention, discloses AGVs that retrieve items from transportation vehicles (e.g., delivery trucks) for delivery to specified locations (e.g., user residences, a commercial business, etc.). In various implementations, the AGVs may be owned by individual users and/or may service a group of users in a given area (e.g., in an apartment building, neighborhood, etc.). The AGVs may travel out (e.g., from a user's residence, apartment building, etc.) to meet a transportation vehicle (e.g., a delivery truck on the street) to receive items, and may be joined by other AGVs that have traveled out to meet the transportation vehicle, and may line up in a particular order (e.g., according to delivery addresses, etc.). After the items are received, the AGVs may travel back (e.g., to the user residences) to deliver the items, and may be equipped to open and close access barriers (e.g., front doors, garage doors, etc.). The AGV may also be equipped with a locked lid that can be opened only by an intended recipient.

The present invention uses the phrase "delivery AGV" or "AGV for package delivery" or other combinations of the terms "AGV" and "delivery" to refer to AGVs having the structure, capabilities and function to navigate to a desired location, such as by navigating public or private sidewalks or neighborhoods, to transport a package to a desired customer or residential or commercial location. Accordingly, a delivery AGW includes an internal chamber for holding a package payload and is limited in speed, such as to 6 mph, 10 mph, or 15 mph, as determined by the particular design guidelines and possibly by state regulation. In this regard, these speeds are referred to herein as low speed.

There are circumstances in which it is desired to stop the AGV as soon as possible. Many braking systems for vehicles have been developed. A delivery AGV, operating at slows speeds, carrying a limited number of items based on its relatively small size, and carrying a limited payload weight (for example, many manufacturers and shippers have a maximum weight for a package, such as 35 pounds or 50 pounds) provides a unique problem regarding braking. For example, a delivery AGV might lose power or undergo hardware or software failure when on flat ground, a slope, etc., may or may not be accompanied by an observer, may unexpectedly generate a command to stop based on sensor information indicating an emergency reason, and like parameters.

Thus, the braking system disclosed herein is a hybrid system that includes a dynamic braking system and a mechanical braking system. The dynamic braking system in general uses drive motors as generators to quickly slow the AGV. Dynamic braking is most effective when the AGV is moving at speed because the magnitude of braking is related to the strength of the magnetic field created by the mechanical rotation of the rotor, which is related to the speed of the AGV. The effectiveness of the dynamic braking system decreases at lower AGV speed.

The type of dynamic braking preferred and described below is achieved by shorting between the motor terminals, which can encompass electrically connecting the motor terminals together or by connecting all the motors windings to ground. Dynamic braking by shorting dissipates all the energy as heat in the motor itself, which in some cases is detrimental to the motor components, as windings may be damaged by heating, high current flows through the brushes can cause arcing, among other detrimental effects in some motors in some circumstances. The chassis, which preferably is aluminum, may be used as the ground.

In many circumstances, such as an emergency stop or unexpected impact, the control system can immobilize the delivery AGV until it can be inspected (either remotely or in person) or retrieved.

Further, the second part of the hybrid braking system is a mechanical brake in which engagement may also immobilize the delivery AGV until it is inspected or retrieved. The mechanical brake, which is referred to herein as a parking brake, that uses mechanical engagement with a moving surface, such as a surface of the wheel, to stop the AGV or to keep it in its stopped state. The braking element of the mechanical brake is spring biased toward the engaged position and is held out of engagement by an electric actuator. Thus, upon stopping and engaging the mechanical brake, the braking element preferably remains engaged to immobilize the delivery AGV until the braking element can be disengaged, which preferably is manually.

Accordingly, the hybrid braking system of the delivery AGV includes an electrical means to short across the motor terminals and a mechanical brake. The electrical means is referred to herein as the electrical brake or an emergency electrical brake. The electrical brake may be used when an emergency stop is required, and is distinguished from the normal braking procedure of diminishing or stopping battery power to the drive wheels. The mechanical brake has attributes of a parking brake. In general, the electrical brake is employed when the AGV is moving at moderate to high speed in order to quickly slow the speed of the delivery AGV to a stop or near stop. The parking brake in general is employed when the AGV is moving at slow speeds or stopped or nearly stopped. The parking brake may also be engaged when the delivery AGV is at moderate to high speed, either as part of an emergency stop or in circumstances in which an emergency stop especially justifies engaging the mechanical brake. Thus, in some circumstances the emergency electrical brake is employed first to slow the speed of the robot, and then the parking brake is engaged. In other circumstances, the emergency electrical brake and the parking brake may be engaged simultaneously or the parking brake may be engaged after engagement of the emergency electrical brake, as desired. The names chosen for the emergency electrical brake and parking brake are not intending to be limiting as to the structure or function of the brakes, as the emergency electrical brake can be employed in circumstances that are not an emergency, and the parking brake can be employed in circumstances that are not for parking or only keeping the AGV in an already stopped state, and may be engaged while the AGV is moving.

Referring to the figures, a delivery AGV 10 disclosed herein includes an upper body 12, a lower body 112, a wheel and suspension assembly 18, a power supply system 40, and a control system 50. Upper body 12 includes a shell 301, a cargo bay 30, front and rear sensors 52F and 52R behind corresponding front and rear windows 341 and 351 in the shell, and a lid assembly 26. AGV 10 also includes a mechanical parking brake 710 and an emergency electrical brake 711. Sensors 52F and 52R are not shown in the figures, and their general location is illustrated in FIG. 1.

Figure 2:
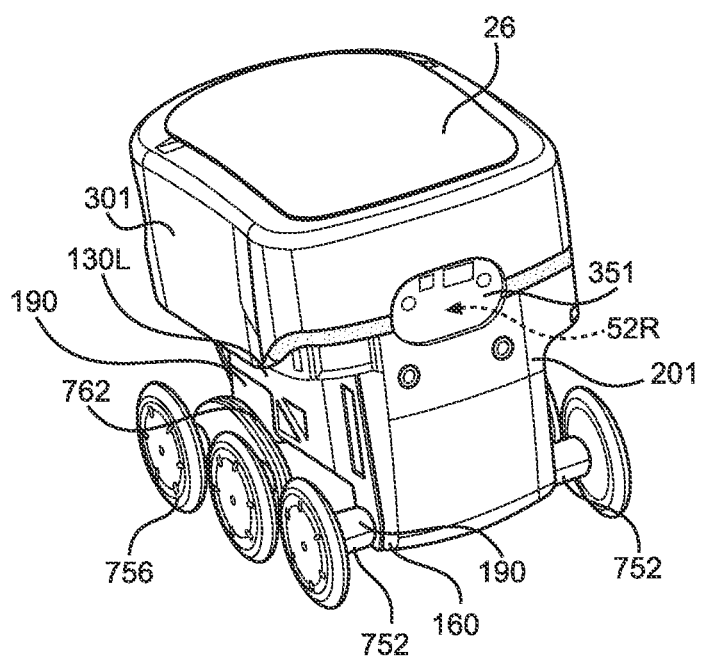
FIG. 2 is another perspective view of the delivery AGV of FIG. 1 with a portion of the shell removed.
Figure 3:
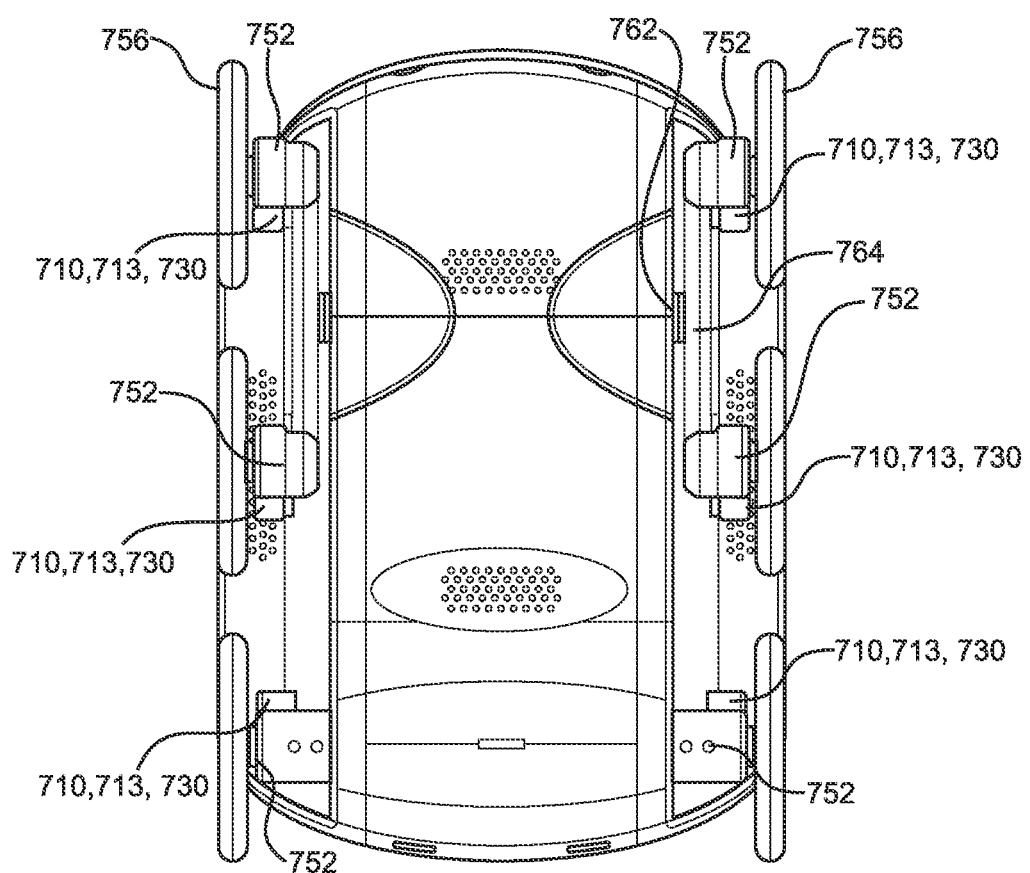
FIG. 3 is a bottom view of the delivery AGV of FIG. 1.

As best illustrated in FIG. 1-3, lower body 112 includes a chassis 110 and a skin or shell assembly 201. Chassis 110 in the embodiment of the figures is formed of sheet aluminum plates, including a bottom wall 120, left and right sidewall 130L and 130R, a front wall 140, and a rear wall 150 (bottom wall, right side wall, front wall and rear wall are not shown). The walls are affixed together, such as by rivets or other conventional means, to form a structure that is unitary and capable of supporting AGV 10. Chassis 110 has an open top and forms a hardware bay for a power system 50, as described below. A processor for overall control and communication functions can be within chassis 110 or proximate front or rear sensors 52F, 52R.

A rear portion of bottom wall 120 and a bottom portion or rear wall 150 merge into a transverse structure 160, which forms a lowermost portion of chassis 110 and provides structural support for the rear wheel assemblies. Transverse frame 160 includes structure features forming rear wheel assembly interfaces. A forward portion of chassis 110 includes holes or cutouts forming front wheel assembly interfaces 190, which in the figures is a plate added to side wall 130. For example, a plate of a hub motor can be bolted to the chassis and interfaces 190. Other configurations are contemplated.

The walls of the chassis include structural and functional features that depend on the particular application, including a tapered nose (that is, front walls 140 tapers when viewed in top view), various openings, tabs, structural cross-members, and the like. The walls of chassis 110 can be formed of any material suitable for supporting the panels and wheel assemblies as the AGV carries the intended load. Aluminum sheet metal is used in the embodiment of the figures. The thickness, specific material, use of stiffeners and other structural supports, and other decisions relating to the material choice and properties can be made according to the particular goals of the AGV, including strength, weight, and like parameters.

Shell 201 is formed of overlapping polymer panels held to chassis 100 by fasteners, such as screws. Shell 301 is formed by overlapping polymer panels held to structural columns. The panels of shell 301 overlap the panels of shell 201.

Upper body 12 includes a lockable, hinged lid 26 that covers and secures packages held in a cargo bay 30 (not shown in the figures). Lid 26 preferably is locked in a manner that enables unlocking by the intended recipient by any means locking and opening means.

A power system 50 (not shown in the figures, as it is housed within body 112) can include batteries 92, motor controllers 610, voltage regulators 620, power board 630, and other components, as needed, to supply and regulate power to the drive wheel assemblies.

Wheel and suspension assembly 18 includes three pairs of drive wheels assemblies: rear drive wheel assemblies 750R, mid drive wheel assemblies 750M, and front drive wheel assemblies 750F. As illustrated in the FIGS. 1-3, rear drive wheel assemblies 750R are supported by transverse frame 160 of the chassis at wheel interface 190. Mid and front wheel assemblies 750M and 750F and connected via a bogie system 760. The bogie mechanism 760 includes an axle or shaft 762 and a bogie arm 764 coupled to an outboard end of shaft 762. Shaft 762 extends through skin 201 and is supported at the front wheel interface 190 of chassis 110. Bogie arm 764 pivots relative to a centerline of shaft 762.

Figure 4:
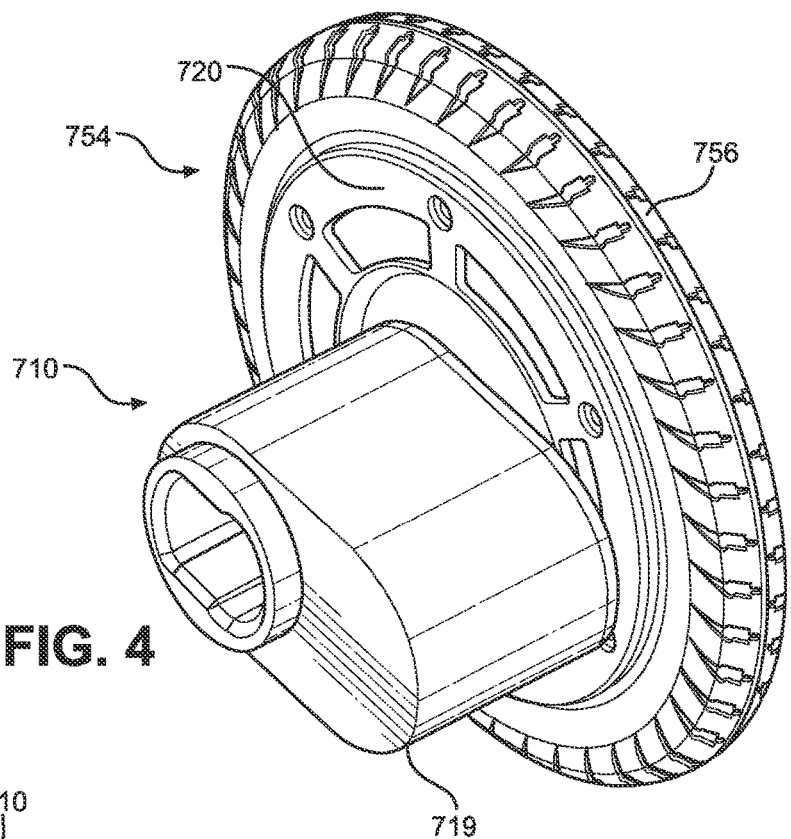
FIG. 4 is an enlarged perspective view of wheel and parking brake assembly of FIG. 3.

Consistent with the convention throughout the description, reference number 750 is used to refer to structure common to all wheel assemblies. Each one of drive wheel assemblies 750 includes a hub-type drive motor 752, which preferably is conventional, and a wheel 754 powered by drive motor 752. Each wheel 754 includes a tire 756 and a disc 720 that is affixed to the rotor or output shaft of the drive motor 752 and the tire 756. FIG. 4 illustrates wheel 754 and a parking brake 710.

Disc 720 preferably is approximately planar and vertical. In some embodiments, a curved configuration and an angled orientation may be used. Tire 756 is mounted at a peripheral circumference of disc 720 such that disc 720 and tire 756 are rotated together when driven by drive motor 752 (not shown in FIGS. 4-6).

Disc 720 includes raised structures, referred to as spokes 724, extending approximately radially outwardly from the relatively flat or even base surface 722, which in the embodiment of the figures is a groove between spokes 724. An outboard face or front face 726 of each spoke is co-planar or parallel or nearly parallel with the surface of disc surface 722. A side face 728 of each spoke 724 can be approximately perpendicular to the surface of disc surface 722, and as explained below can match a corresponding surface of the pin.

As illustrated, spokes 724 are straight, and straight spokes are not required. Accordingly, the term "radial" when used with reference to spoke 724 refers to a direction or orientation that has a radial component. Radial spokes can have a forward or rearward-directed curve or arc or pitch. Spoke front face 726 smoothly merges into the surface 722, and other shapes and configurations are contemplated.

Figure 5:
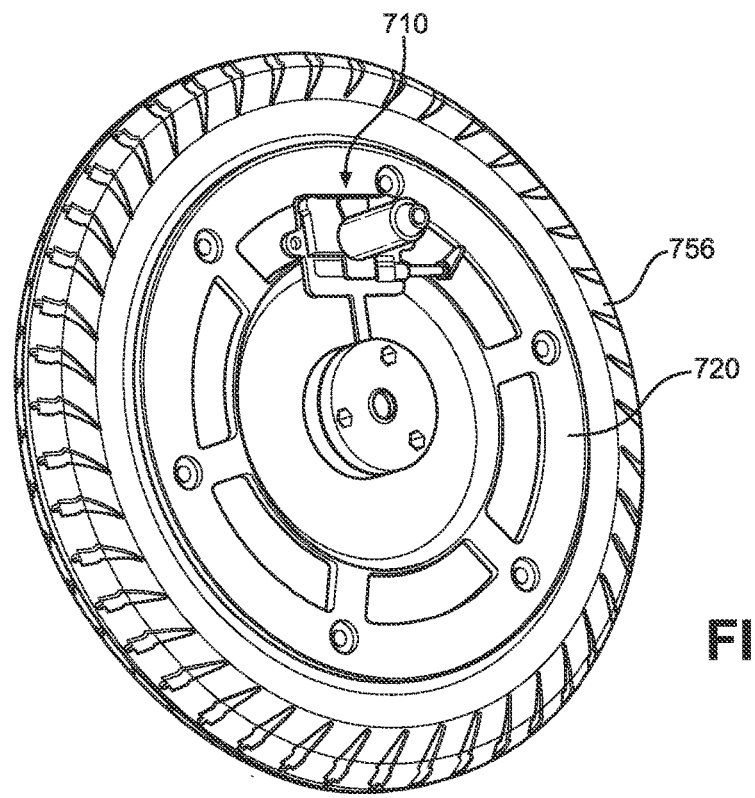
FIG. 5 is another perspective view of the structure of FIG. 4 with a portion of the parking brake assembly removed for clarity.
Figure 6:
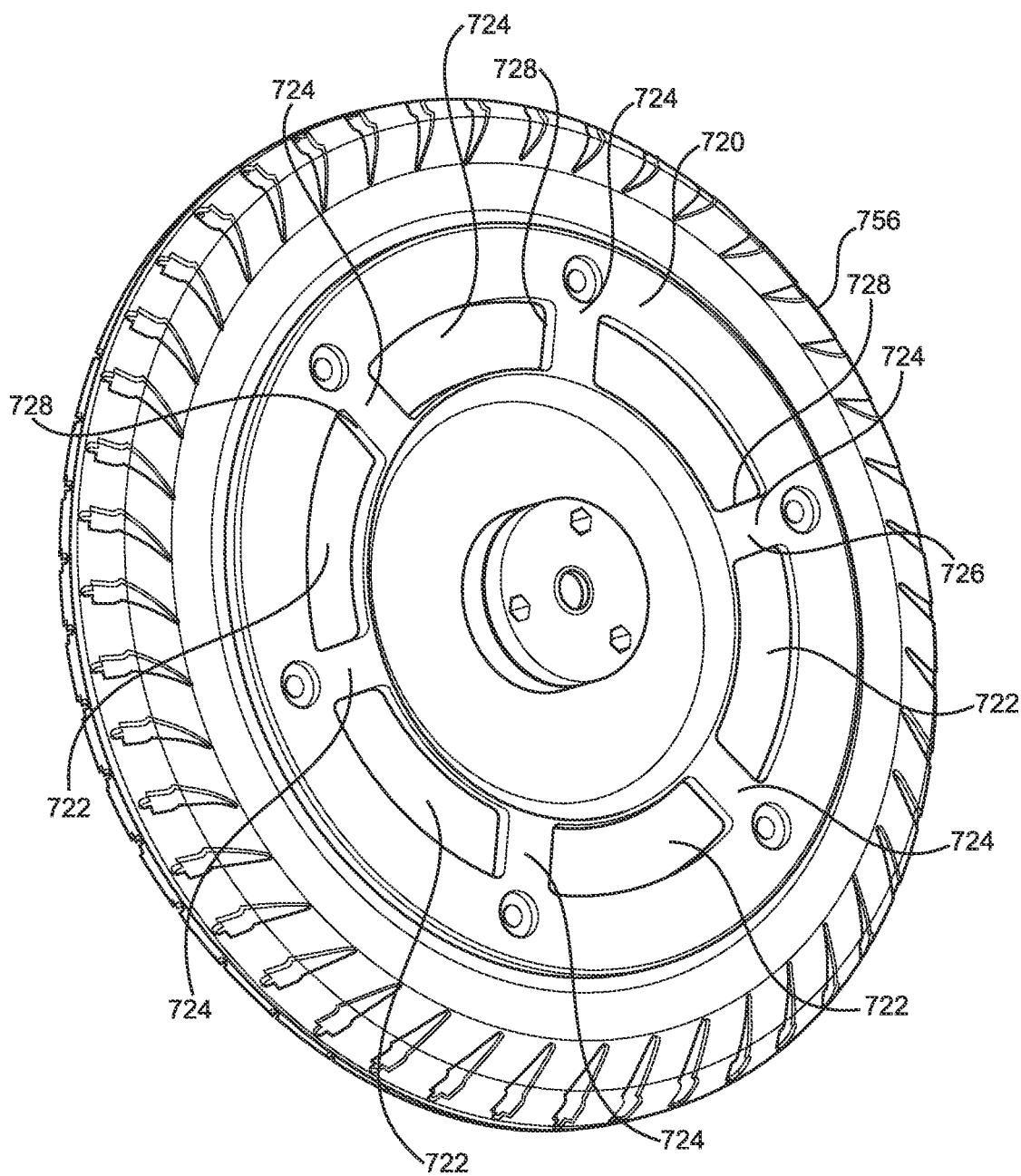
FIG. 6 is a perspective view of wheel assembly with the pin assembly of the parking brake assembly removed for clarity.
Figure 7:
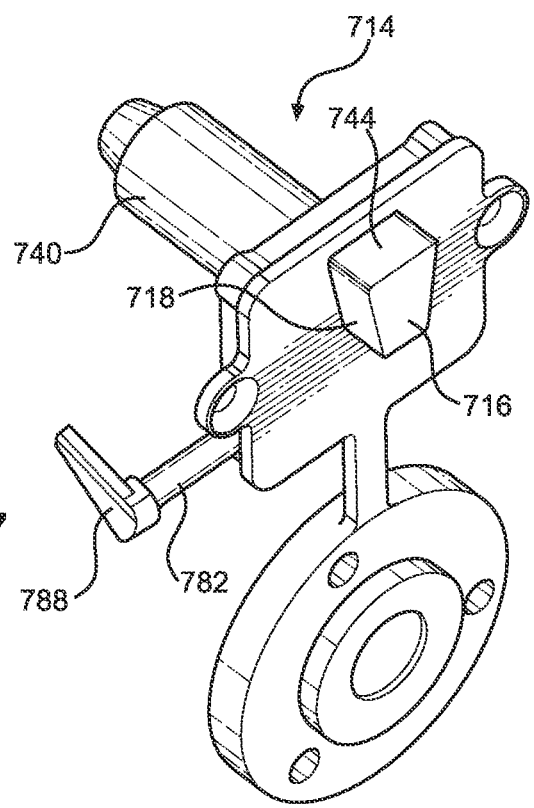
FIG. 7 is a perspective view a portion of the parking brake assembly isolated from other portions of the AGV.
Figure 8:
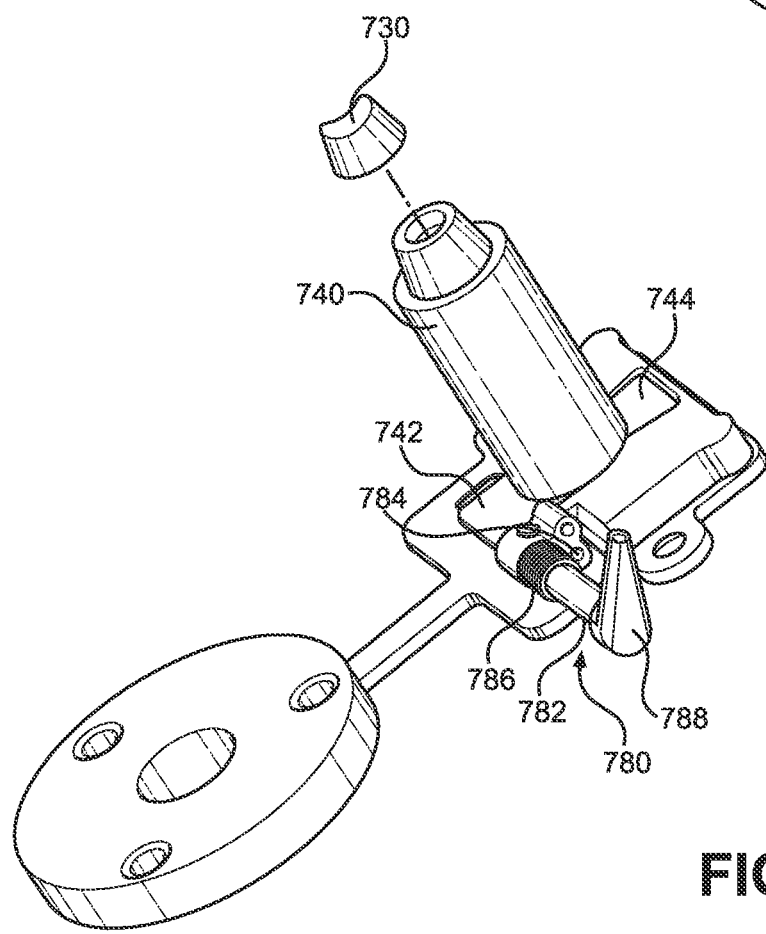
FIG. 8 is another perspective view of the structure of FIG. 7.
Figure 9:
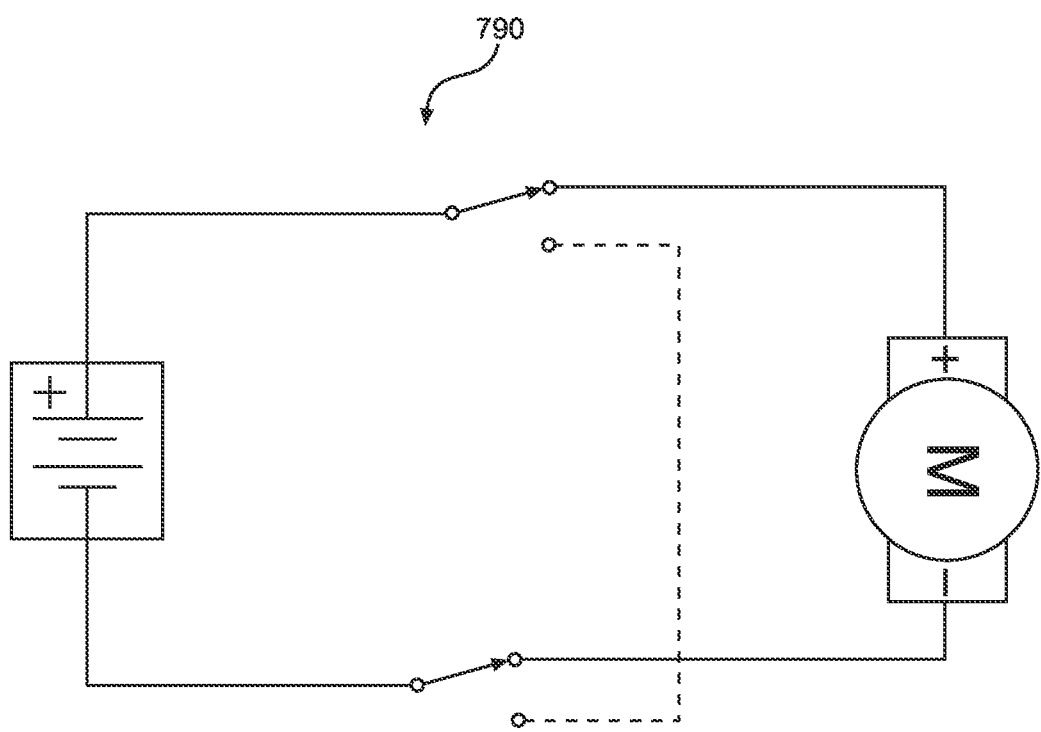
FIG. 9 is a simplified electrical schematic of the electrical braking system.

A parking brake 710 includes a braking element, a biasing element, and an actuator. In the embodiment of FIGS. 5, 7, and 8, the braking element is a pin 714 that is moveable (preferably in translation or linearly) into and out of engagement with the disc 720 of the wheel assembly. Pin 714 has a body, a distal contact face 716 and a side contact face 718. Pin 714 is located in a housing 719. The body includes an integral shaft 740, a plate 742, and a contact element 744 on which surfaces 716 and 718 are formed.

The actuator is an electrical actuator, such as a solenoid 730 (shown schematically in FIG. 3), that is connected to or housed in drive motor 752, such as in housing 719. Solenoid 730 has an output shaft on which pin 714 is mounted, or solenoid 719 may act on a shaft portion of pin 714 directly. Other devices and positions for aligning pin 714 with wheel disc 720 and for moving pin 714 in response to movement of an actuator may be employed. The biasing element of the solenoid is a spring, such a coil or helical spring 732 (not shown in the figures), that biases pin 714 toward its engaged position. Spring 732 can be integral with the solenoid (such as can be supplied by a commercially available solenoid) or separate from the solenoid, or both.

Solenoid 730 when energized retracts pin 714 such that pin 714 is not in contact with wheel disc 720, permitting the wheel assembly 750 to rotate in response to torque applied by drive motor 752. When it is desired to engage parking brake 710, a control signal may be sent from control system 50 to de-energize solenoid 730, which then no longer applies the force to retract pin 714. In response, spring 732 moves pin 714 toward wheel disc 720 until one or both of the pin contact faces contact wheel disc 720.

When wheel disc 720 is stationary—that is, the AGV is at rest—distal surface 716 can engage the surface 722 of wheel disc 720 or, depending on the circumferential position of the wheel, might align with and engage an outboard surface 726 (that is, the top surface) of one of the spokes 724. The static friction force between the pin distal surface 716 and the disc surface 720 or surface of the spoke surface 726 may be sufficient to retain AGV 10 in its stopped position or, in other words, perform the parking brake function.

In other circumstances, such as when AGV 10 is on an incline or the AGV is stopped on level ground but an external horizontal force is applied (such as may occur of the AGV is pushed), the location of contact of the pin and wheel may change. If initially distal surface 716 of pin 714 contacted disc surface 722 and the external force is sufficient to overcome the cumulative friction forces of all of the brakes 710, then the wheel can rotate relative to pin 714 such that pin distal surface 716 slides on wheel surface 722 until the side face 718 of pin 714 engages the spoke side face 728, which then would stop the AGV movement. If initially distal surface 716 contacted disc front surface 722, and an external horizontal force is applied, the wheel 754 can rotate such that pin surface 716 slides on spoke surface 726 until spoke 724 rotates past pin 714. Spring 732 applies its force such that pin 714 moves into engagement toward wheel 750 such that distal surface 716 engages disc surface 722. And then pin distal surface 716 can slide on wheel surface 722 until the side face 718 of pin 714 engages the side face 728, which then would stop the AGV movement.

As best illustrated in FIGS. 7 and 8, parking brake 710 can include an unlocking or releasing system 780 that is intended for either manual or automated unlocking of parking brake 710 by disengaging contact element 784 from the wheel surfaces 722 and 728.

Unlocking mechanism 780 includes a shaft 782, a cam 784, a biasing spring 786, and a handle 788. Handle 788 is mounted on an end of shaft 784 opposite to cam 784, which is eccentric relative to shaft 782. Spring 786 as shown is a torsion spring about shaft 782. Cam 784 extends beneath plate 742.

FIGS. 7 and 8 illustrate pin 714 in the engaged position, in which the contact element 744 is in an extended position corresponding to the parking brake engaged to stop rotation of the wheel. Unlocking mechanism is configured such that rotating handle 788 (counterclockwise in the view of FIG. 8) pivots shaft 782. Cam 784 contacts an underside of plate 742 such as shaft 782 moves counterclockwise, cam 784 pushes upwards on plate 742 to retract the entirety of pin 714 against the force of the force of the biasing spring of the solenoid 730. The cam 784 can retain the pin in the retracted position for manual or automatic movement of the AGV. Upon retraction by solenoid 730, the spring 786 resets unlocking mechanism to its ready position. Unlocking mechanism 780 can also be reset by a manual torque applied to handle 788.

The emergency braking system preferably is a hardware or electronic switch that connects each motor terminal of each drive motor 752. As illustrated in schematically in FIG. 10, the power system includes switches 790 or like feature to short motor terminals T to ground.

Accordingly, in operation, a method of stopping driving motion, including forward or backward movement, of a delivery AGV includes the steps of both (i) shorting across terminals each drive motor powering drive wheels of the AGV while the AGV is in motion, thereby ramping down speed of the AGV; and (ii) releasing a pin of a parking brake such that the pin engages a rotating contact surface of the wheel, thereby braking rotation of the wheel.

In some circumstances, the electrical brake will be engaged until the AGV speed is reduced to a predetermined velocity, and then the parking brake is engaged by releasing pin 714 for engagement with disc surface 720. Alternatively, both the electrical brake and parking brake can be engaged regardless of the speed of the AGV.

Further, solenoid 730 can be equipped with a delay circuit (illustrated schematically in FIG. 3), such as may include capacitors, to enable solenoid 730 to continue to provide a retracting force to pin 714 even if power is unexpectedly lost.

The control algorithms for controlling the straight-ahead movement, turning, and rotating AGV 10 are well known, as will be understood and employed by persons familiar with battery powered vehicles.

Control system 50 includes sensors 52F and 52R and other components and systems used for navigation and guidance, avoiding objects, image-capture and sensing, power management, communications, security, and other functions inherent in achieving the goals of a delivery AGV. Sensors 52F and 52R can be mounted behind a forward facing window 341 and/or a rearward facing window 351. Sensors 60 can include cameras having images sensors including image signal processing, light sensors, and the like, with corresponding processing including image decoding, lens correction, geometrical transformation, video stream transcoding, video analytics, image capture, and compression to provide obstacle detection and obstacle identification. Sensors for determining speed may also be employed. Panel 28F (and 28R) can be transparent polymer, such as (for example) acrylic, Plexiglas, or polycarbonate.

Sensors 52F and 52R can include RADAR sensors, such as SRR (Short-range radar) applications and MRR/LRR (mid-range radar, long-range radar) applications; LIDAR sensors, such as infrared LIDAR systems that with the aid of a Micro-Electro-Mechanical System (MEMS), which use a rotating laser, or a solid-state LIDAR. Control system 50 can also include GPS modules, inertial guidance modules such as an inertial measurement unit (IMU) having gyroscopes and accelerometers (preferably in each of the x, y, and x directions), power management modules to control power, overall consumption, and thermal dissipation. Other modules, components and functions are contemplated.

Control system 50 and sensors 52F and 52R may also be employed in controlling the driving and turning of AGV 10 during normal conditions. For example, a speed sensor on the wheels, sensors on motor current and/or voltage, gps, accelerometer, gyroscope, optical sensors, and the like may be employed to determine a safe straight-ahead speed, safe turning radius and velocity for the vehicle and package (taking into account the possibility of encountering a person who might not see or be expecting the vehicle), safe stopping distance to provide feedback to the controller for determining the speed, and the like.

Control system 50 may also include a package delivery module and corresponding sensors. For example, a sensor can be associated with a closed position of lid 26 to assure that a package to be delivered to a residential or commercial destination is secure in chamber 24 during transport. A means for unlocking a lock on lid 26 (or unlocking a actuator for lid 26 or like means) can include a keypad, a wireless communication system (for working with Wi-Fi, cellular data, Bluetooth, NFC or other communication means to send a signal to the lock upon verification), a facial or fingerprint recognition module, or the like may also be included.

Control system 50 controls the movement of AGV 10 to a desired destination, the delivery of a package within chamber 24 to an authorized recipient, and/or movement of AGV 10 to a home location. In this regard, the description of control system 50 and sensors 52F and 52R, and United States Patent Publication Number 20180024554 and/or industry practice in view of the present disclosure may inform the functions in this regard.

It is, of course, the goal of control system 50 to avoid unintentional contact, especially for people, pets, and the like. Contact is referred to herein as transient contact to distinguish it from intentional, low-force contact (such as opening the lid to access a package) and contact over a significant period, such as leaning against or placing a foot on the robot, of the type that is not a risk, or is a low risk, of injuring a person. In the event of transient contact, the energy absorbing means disclosed herein are intended to diminish the magnitude of energy transmitted to a person by an AGV, compared with an unmodified solid or rigid surface of prior art AGVs currently commercialized.

The present invention has been illustrated by using examples of possible embodiments. The present invention is not limited to the structure, function, and/or materials set out herein. For example, the motor, mechanical pin, and wheel are illustrated as discrete components. The inventors surmise that the motor, pin, and wheel can be formed as an integral unit, and thus the claims should be interpreted in this light. It is intended that the invention be given its broadest appropriate scope.

We claim:

1. An autonomous ground vehicle (AGV), comprising:
   a body for carrying a package;
   a plurality of wheel assemblies, at least one of the wheel assemblies being a battery-powered, motorized wheel assembly adapted for driving the body, the motorized wheel assembly comprising a disc and a motor, the disc having at least one feature; and
   a hybrid braking system comprising:
      an electrical brake adapted for short circuiting the motor while the AGV is moving; and
      an electro-mechanical brake including a mechanical element adapted for engaging at least one feature of the disc to mechanically block rotation of motorized wheel assembly.

2. The AGV of claim 1, wherein the mechanical element is spring biased toward an engaged position in which the mechanical element engages the at least one feature of the disc, and is adapted to be retracted by an electric actuator to a retracted position.

3. The AGV of claim 1, wherein the electrical brake is adapted for short circuiting the motor by shorting terminals of the motor to around.

4. The AGV of claim 1, wherein the feature of the disc is a spoke-shaped structure extending from the disc.

5. The AGV of claim 1, wherein the feature of the disc is a recess adapted for receiving the mechanical element.

6. The AGV of claim 1, wherein movement of the mechanical element to engage the at least one feature of the disc is delayed relative to the short circuiting of the motor.

7. An autonomous ground vehicle (AGV), comprising:
housing defining a cargo bay adapted for holding at least one package;
a lid releasably covering the cargo bay;
a plurality of wheel assemblies adapted for supporting the housing, at least one of the wheel assemblies including a wheel, the wheel having at least one feature;
at least one motor adapted to provide torque to the at least one wheel assembly;
one or more batteries electrically connected to the at least one motor for providing power to the at least one motor;
an electrical brake adapted for shorting across terminals of the at least one motor while the AGV is moving;
an electro-mechanical brake including a mechanical element that is biased toward an engaged position and that is adapted to be retracted by an electric actuator to a retracted position, wherein, when in the engaged position, the mechanical element contacts the feature of the wheel to prevent or block rotation of the wheel; and
a control system adapted for controlling the power supplied to the motor to control the speed of the AGV.

8. The AGV of claim 7, wherein each of two or more of the wheel assemblies includes one of the at least one motors coupled thereto.

9. The AGV of claim 8, wherein the at least one motor is a hub motor including a rotor that is coupled to the wheel.

10. The AGV of claim 8, wherein the electrical brake and the electro-mechanical brake are adapted for engaging simultaneously while the AGV is moving.

11. The AGV of claim 8, wherein the electrical brake and the electro-mechanical brake are adapted to be engaged sequentially while the AGV is moving.

12. The AGV of claim 8, wherein the mechanical element includes a pin having a flat contact surface that contacts the feature of the wheel.

13. The AGV of claim 12, wherein the feature of the wheel is a spoke-shaped structure extending from on an inboard surface of the wheel.

14. The AGV of claim 12, wherein the feature of the wheel is a recess adapted for receiving the flat contact surface.

15. The AGV of claim 11, further comprising a delay circuit adapted for delaying movement of the mechanical element to the engaged position upon depowering the electrical actuator.

16. The AGV of claim 15, wherein the delay circuit includes a capacitor adapted for temporarily powering the electric actuator.

17. The AGV of claim 8, wherein the electro-mechanical brake includes a spring for biasing the mechanical element.

18. The AGV of claim 8, further comprising a mechanical unlock mechanism adapted for releasing the mechanical element from the feature of the wheel.

19. The AGV of claim 8, wherein movement of the mechanical element to the engaged position is delayed relative to the shorting across terminals of the at least one motor.

20. The AGV of claim 8, wherein the control system is adapted to de-energize the electric actuator to cause the mechanical element to move to the engaged position.

* * * * *